June 23, 1942.　　　G. W. WILLARD　　　2,287,587

LIGHT MODULATING APPARATUS

Filed Nov. 2, 1939　　　5 Sheets-Sheet 1

INVENTOR
G. W. WILLARD
BY
C. N. Sprague
ATTORNEY

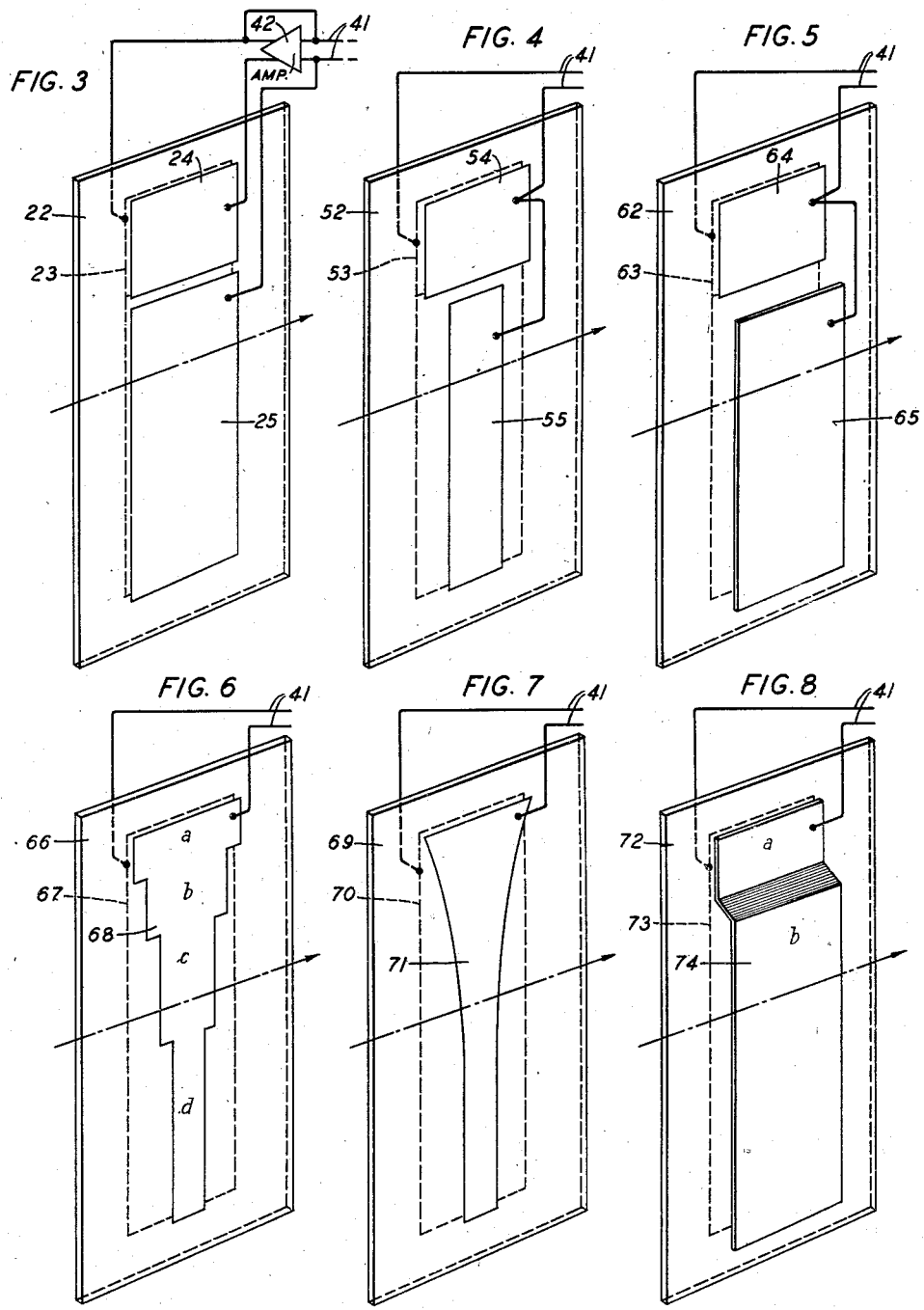

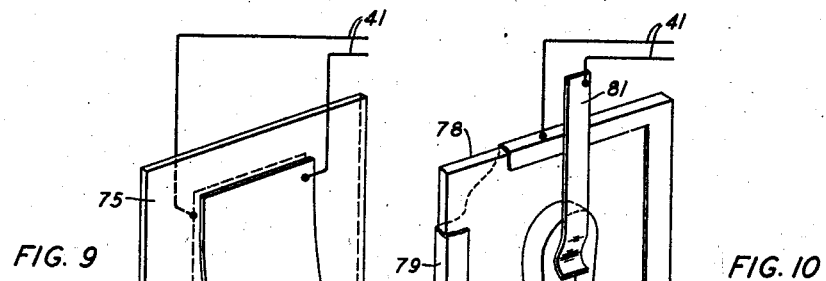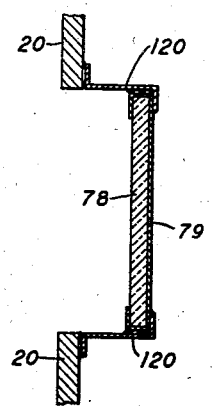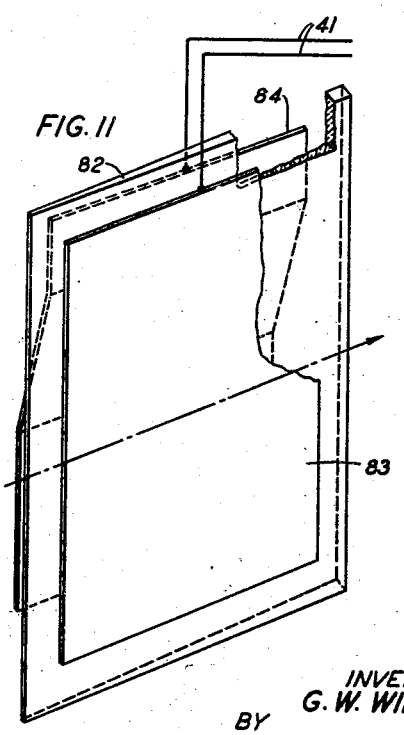

June 23, 1942.　　　G. W. WILLARD　　　2,287,587
LIGHT MODULATING APPARATUS
Filed Nov. 2, 1939　　　5 Sheets-Sheet 4

INVENTOR
G. W. WILLARD
BY
C. A. Sprague
ATTORNEY

June 23, 1942.                G. W. WILLARD                2,287,587
                         LIGHT MODULATING APPARATUS
                         Filed Nov. 2, 1939          5 Sheets-Sheet 5

INVENTOR
G. W. WILLARD
BY
C. A. Sprague
ATTORNEY

Patented June 23, 1942

2,287,587

UNITED STATES PATENT OFFICE 2,287,587

LIGHT MODULATING APPARATUS

Gerald W. Willard, Fanwood, N. J., assignor to Bell Telephone Laboratories, Incorporated, New York, N. Y., a corporation of New York Application November 2, 1939, Serial No. 302,544

18 Claims. (Cl. 88—61)

This invention relates to apparatus for modulating light and particularly to a light modulating apparatus of the type known as the supersonic light valve.

An object of the invention is to improve the operating characteristics of light valves.

Another object is to increase the ratio of maximum to minimum light transmission through a supersonic light valve over a substantially linear operating characteristic.

A supersonic light valve or light modulating cell operates in accordance with the phenomenon discovered by Debye and Sears, which is described by them in the Proceedings of the National Academy of Sciences, Washington, volume 18, pages 409 to 414, June 15, 1932, that compressional waves in a liquid cause diffraction of light. Light passing through the supersonic cell in a direction parallel to the wave fronts of the compressional waves in the liquid is transmitted with a higher velocity through the regions of rarefaction than through the regions of compression and the velocity of light transmission through these regions is dependent upon the amplitude of the compressional wave. The plane waves in the liquid with their periodic compressions and rarefactions act similarly to a diffraction grating, with its periodic light and dark regions, in that the angles of diffraction are the same for equal spacings. An important difference is found, however, in the ratio of diffracted to undiffracted light. Whereas an ordinary diffraction grating allocates a fixed amount of light to each order of diffraction including the zero or undiffracted order, the supersonic wave grating gives an amount of light in the different orders which changes with the amplitude of the waves. When the waves are of zero amplitude, all the light falls in the zero order (undiffracted) and as the amplitude of the waves is increased, the amount of light in the zero order is decreased and that in the higher orders is increased, the total amount of light transmitted remaining the same.

In a supersonic light modulating apparatus, the compressional waves are ordinarily set up in a liquid by a piezoelectric driver element which is set into vibration under control of a voltage from a high frequency source modulated in accordance with signals. Either the undiffracted light is intercepted and only the diffracted light transmitted or, conversely, the diffracted light is intercepted and only the undiffracted light transmitted.

High speed light valves, specifically supersonic light valves, have been found to have a voltage-light transmission characteristic which is approximately linear over a certain light transmission range, but which is non-linear at low values of light transmission. At light transmission values near zero, the rate of change of light transmission with respect to control voltage is less than the substantially constant rate of change of light transmission with respect to control voltage over the linear portion of the characteristic. It has been found to be desirable to modulate light in accordance with a linear relationship between light transmission and control voltage starting with zero or a very low value of light transmission or, in some cases, in accordance with a relationship having a higher ratio of light transmission to control voltage at low values of light transmission than at higher values of light transmission. It is important to operate the light valve at as low a value of minimum light transmission as possible, since the ratio of maximum to minimum transmission determines the maximum contrast which can be obtained in an image produced by light transmitted through the light valve. Accordingly, it is also important to prevent or reduce the amount of stray light transmission through the optical system.

It is apparent that a large number of compressional wave cycles may be present in the supersonic cell at any instant and that different cycles or groups of cycles may have different amplitudes, respectively. Therefore, different portions of the cell along the direction of wave propagation through the cell may simultaneously control the transmission of different portions of a light beam incident upon the cell, each portion controlling the transmission of light in accordance with the wave amplitude at that portion. However, in any ordinary supersonic cell all portions of the light beam are controlled in accordance with the same light transmission-voltage characteristic curve.

In accordance with the present invention, a light beam is partially modulated or controlled in accordance with a certain light transmission-voltage characteristic curve and partially modulated or controlled in accordance with a different light transmission-voltage characteristic curve, said characteristic curves having different slopes, respectively, at a certain value of light transmission. Different portions of a light beam may be simultaneously separately modulated in accordance with light transmission-voltage characteristic curves having different shapes, respectively, and the separately modulated portions of the light beam combined to obtain a light beam which is modulated in accordance with a light transmission-voltage characteristic curve having a desired shape. Alternatively, a light beam may be partially modulated in accordance with a certain light transmission-voltage characteristic curve and the partially modulated beam further modulated in accordance with a different light transmission-voltage characteristic.

There are shown and described herein, by way of example, several supersonic light modulating arrangements in accordance with the present invention. In accordance with one of the embodiments of the invention a plurality of electrodes are employed at one face of the piezoelectric crystal and a single electrode at the other face, that is, there are provided a plurality of pairs of electrodes since the common electrode could, if desired, be divided into a plurality of electrodes corresponding in dimensions and in position to the plurality of electrodes on the opposed faces. If desired, a plurality of separate crystals, one for each pair of electrodes, could be provided instead of the single crystal. The surfaces of the plurality of electrodes may be of different size in one or both dimensions, respectively, and moreover one of the plurality of electrodes may be differently spaced from the common electrode than another of the plurality of electrodes. Instead of providing a plurality of electrodes at one face of the crystal, there may be provided a single electrode, a dimension of which along an axis of the electrode varies or the spacing of which with respect to the common electrode is different at different points on the electrodes, respectively, or both.

In order to improve the linearity of response of the supersonic light valve with respect to frequency, over a wide frequency range, it is desirable to employ a piezoelectric crystal which is tapered in thickness from one edge to an opposite edge along the direction of light transmission through the cell. The taper is preferably such that the rate of change of natural frequency with respect to distance from an edge of the crystal is a constant, or nearly a constant, it being well known that an X-cut quartz crystal, for example, has a fundamental frequency of 2860 kilocycles per millimeter of thickness.

The fidelity of response of a supersonic light valve is also improved by efficiently absorbing the compressional wave at the end of the cell remote from the piezoelectric driving element. For this purpose there is preferably employed several layers of very fine mesh wire screen.

The invention will now be described more in detail with reference to the accompanying drawings in which.

Figure 1:
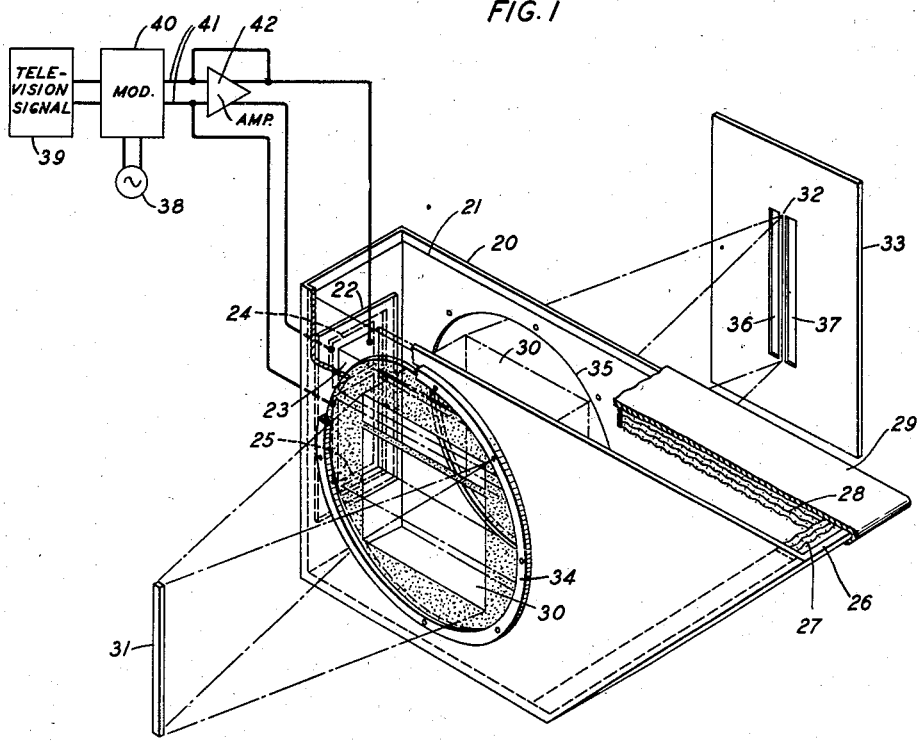
Fig. 1 is a diagrammatic view of a supersonic light valve controlled by a source of television signals in accordance with the present invention.
Figure 2:
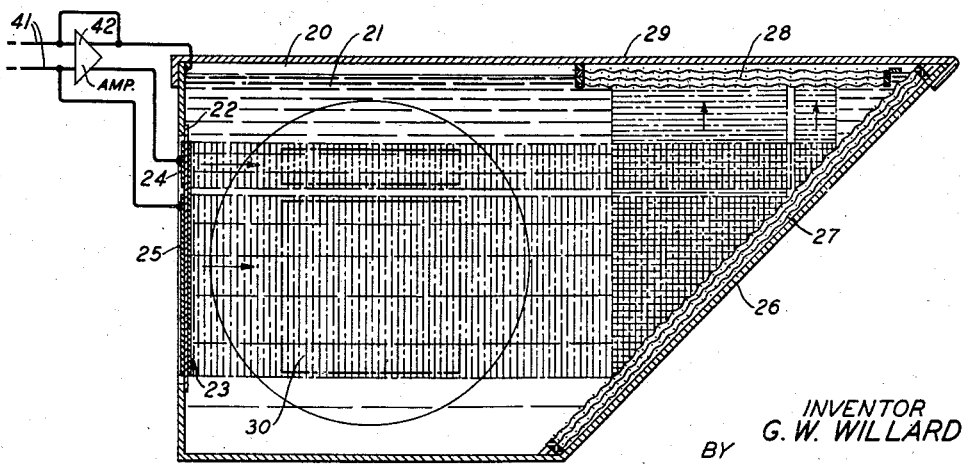
Fig. 2 is a sectional view of the supersonic cell of Fig. 1.
Figure 12:
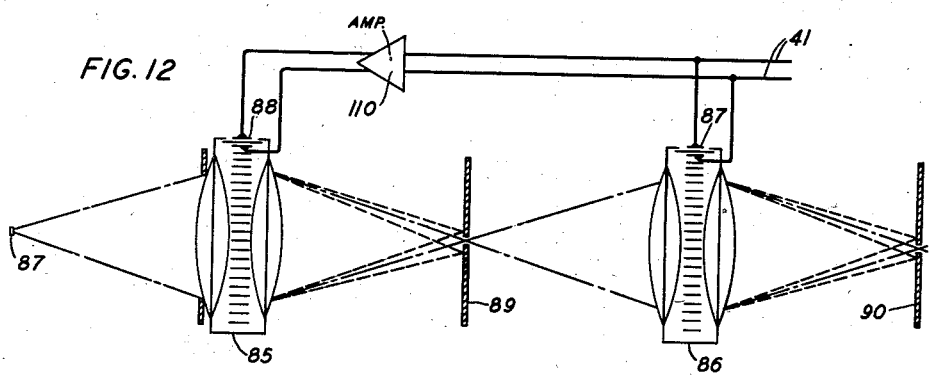
Figure 13:
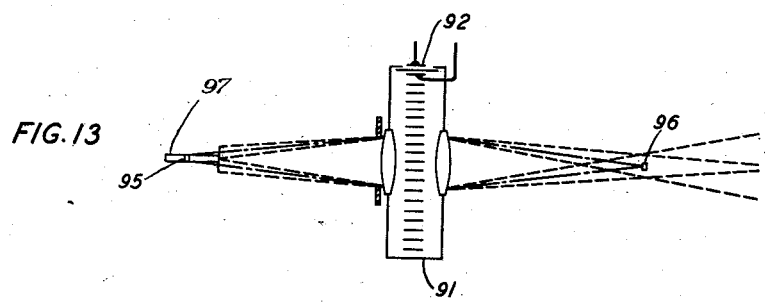
Figure 14:
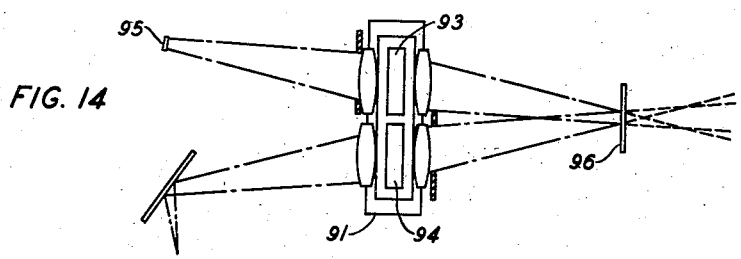
Figure 15:
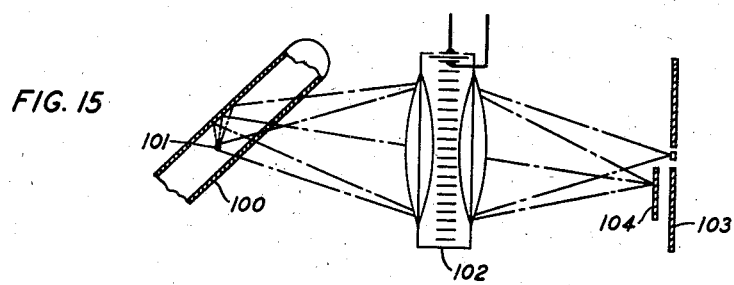

Figs. 3 to 10, inclusive, and 11 are perspective views of piezoelectric driver elements which may be used in the supersonic cell shown in Figs. 1 and 2;

Fig. 10A is a detail view of a mounting for the piezoelectric crystal of a supersonic light valve;

Figs. 12, 13 and 14 are diagrammatic views of supersonic light modulating apparatus in which a light beam is acted upon in a plurality of stages along its path of propagation, in accordance with the present invention;

Fig. 15 is a diagrammatic view of light modulating apparatus to illustrate the manner in which stray light may be prevented from entering the light modulating system.

Figure 16:
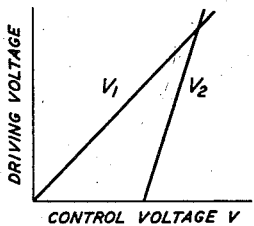
Figure 17:
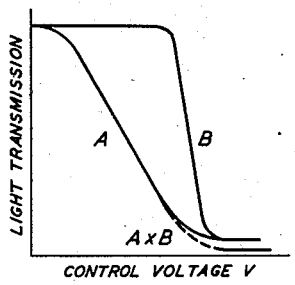
Figure 18:
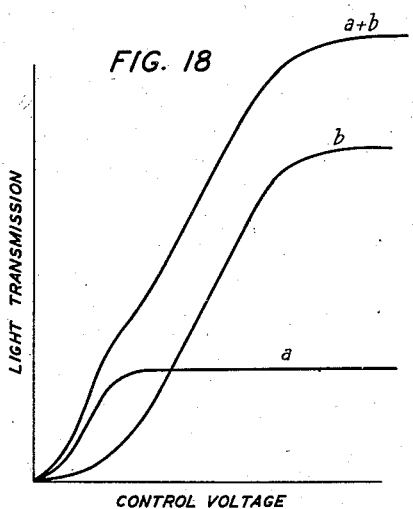
Figure 19:
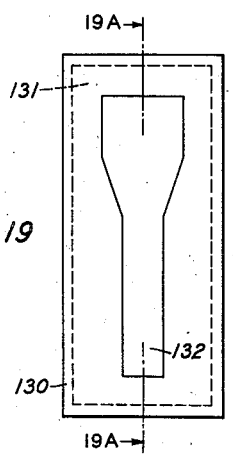
Figure 19A:
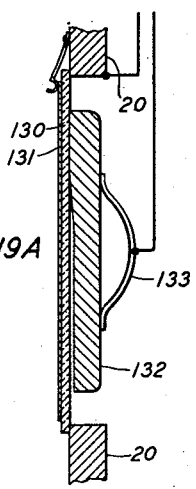

Figs. 16 to 18, inclusive, are curves which will be used to explain the operation of the light modulating apparatus;

Figs. 19 and 19A are views in front elevation and in side elevation partly in section, respectively, of a piezoelectric driver element which may be used in Figs. 1 and 2; and Fig. 20 consists of curves to which reference will be made in connection with Figs. 19 and 19A.

Referring now to Figs. 1 and 2 of the drawings, there is provided a supersonic cell comprising a vessel or tank 20 filled with a suitable liquid or other translucent elastic substance, such as water, indicated by the numeral 21. A piezoelectric driver element for setting up compressional waves in the liquid is provided at one end of the tank. It comprises preferably an X-cut quartz crystal 22 the dimensions of which are ½ inch by 3 inches, for example, cemented with sealing wax or other suitable material to the inner surface of the tank to close an opening provided therein for receiving the driver, an inner electrode 23 and a plurality of outer electrodes 24 and 25. If desired, the edges of the crystal may be metal plated and soldered to the tank. The crystal plate radiates waves into the liquid only over regions covered by electrodes on both sides with sharp cut-off at the electrode boundaries. As indicated by the horizontal arrows in Fig. 2, the waves are propagated through the liquid in a horizontal direction from left to right. The end wall 26 of the tank forms an angle of about 45 degrees with respect to the direction of wave propagation so that any wave energy which may be specularly reflected will be reflected vertically as indicated by the vertical arrows. In order to absorb the once used compressional waves and prevent their return into the useful portion of the cell, there are provided several layers of fine mesh wire screen 27 and 28 along the end wall 26 and along a portion of the cover 29. The wire screens may be about 50 mesh when the frequency of the radiated waves is of the order of 10 megacycles. As the average frequency is increased a finer wire mesh should be used. Three layers of wire screen separated by about ⅛ inch to ⅜ inch may be employed for example.

When used for television image production, the usable optical aperture of the cell may be about 3 inches by 4 inches, for example, and plate glass windows 30 are cemented to the inner surface of opposite walls of the tank 20 to cover openings of this size. Light from a source indicated at 31, .08 inch by 1 inch, for example, is directed through the cell in parallel rays and imaged upon the light intercepting bar 32 of a bar separator screen 33 by means of the spherical lenses 34 and 35 secured to the outer surface of the tank 20, over the windows 30. There are two light transmitting apertures 36 and 37 in screen 33, one on each side of the bar 32. The undiffracted portion of the light from source 31 is thus intercepted by the bar 32 while the diffracted portion of the beam is transmitted through the apertures 36 and 37 whence it may be directed through a suitable optical system comprising lenses and one or more mirror drums, for example, to an image producing screen. The light source 31 may be a 1000 watt water-cooled mercury arc lamp for example. If desired, a light intercepting strip may be provided on the windows 30 to prevent light from passing through the space between the upper plate 24 and the lower plate 25.

As shown in Fig. 1, alternating current having a frequency of 10 megacycles per second, for example, from source 38 and television signals (without carrier) from source 39 are supplied to a modulator 40 and the amplitude modulated high frequency electromotive force is supplied directly through leads 41 to the common inner electrode 23 and to one of the outer electrodes 25 and through an amplifier 42 to the common inner electrode 23 and the other outer electrode 24. If desired, a carrier electromotive force modulated with respect to amplitude in accordance with the television signals may be applied directly to the crystal electrodes if the natural frequency of the crystal corresponds to the carrier frequency.

Any of the piezoelectric driver elements shown in Figs. 3 to 11, inclusive, may be used in the supersonic light modulator shown in Figs. 1 and 2. In each of Figs. 3 to 11, inclusive, the direction of light propagation through the cell is indicated by the arrow.

The piezoelectric driver element of Fig. 3 is an enlarged perspective view of the driver element used in the supersonic cell shown in Figs. 1 and 2, viewed from that side of the driver element as shown in Figs. 1 and 2 which is out of contact with the liquid in the supersonic cell and comprises the quartz crystal 22, inner electrode 23 and outer electrodes 24 and 25, the energizing leads 41 being directly connected to electrodes 23, 25 and through amplifier 42 to electrodes 23, 24. As shown the electrodes have the same dimension in the direction of light propagation but the electrode 24 is shorter than the electrode 25 in the direction perpendicular to the direction of light propagation. Thus the portion of the crystal covered by the electrode 24 controls the modulation of a smaller portion of the light beam than that controlled by the portion of the crystal covered by electrode 25 and the amplitude of the signal voltages applied to electrodes 23, 24 is larger than that applied to electrodes 23, 25. The electrodes 24 and 25 are equally spaced from the electrode 23 at all points thereof. Instead of the structure shown in Fig. 3, two crystals may be employed, one for electrodes 23, 24 and one for electrodes 23, 25 and the inner electrode 23 may also be divided. When employing two electrodes 24, 25 on one side of the crystal in a supersonic cell, the structure functions like two cells which may have different light transmission-control voltage characteristics, respectively, and for convenience we may refer to the supersonic cell having the driver 22, 23, 24 and a second supersonic cell having a driver 22, 23, 25.

The driver of Fig. 4 is somewhat like the driver shown in Fig. 3 and comprises the crystal 52, inner electrode 53 and outer electrodes 54 and 55, both pairs of electrodes 53, 54 and 53, 55 being directly connected to the energizing leads 41. In this case the upper electrode 54 is wider in the direction of light propagation and shorter in the direction perpendicular to the direction of light propagation than the electrode 55. Thus the upper cell having a driver 52, 53, 54 controls less light than that controlled by the lower cell having the driver 52, 53, 55 but at low voltages the light is more effectively modulated by the upper cell because the light path through the compressional wave set up by driver 52, 53, 54 is relatively longer.

In Fig. 5 the driver for the supersonic light valve comprises the crystal 62, inner electrode 63 and outer electrodes 64 and 65, both pairs of electrodes being directly connected to the energizing leads 41. The dimensions of electrodes 64 and 65 are like the dimensions of electrodes 24 and 25 of Fig. 3, but the spacing between electrodes 63 and 65 is greater than that between electrodes 63 and 64. The light transmission at low operating voltages is consequently greater for the upper cell 62, 63, 64 than for the lower cell 62, 63, 65.

The driver of Fig. 6 comprises a crystal 66, inner electrode 67, and outer electrode 68, while in Fig. 7 the driver comprises a crystal 69, inner electrode 70 and outer electrode 71. The electrode 68 has four portions a, b, c, and d of progressively decreasing width in the direction of light propagation through the cell and of progressively increasing height in a direction perpendicular to the direction of light propagation. A supersonic cell having the driver 66, 67, 68 therefore may be considered as four cells having outer electrodes 68a, 68b, 68c and 68d, respectively, these cells having different light transmission-voltage characteristics, respectively. The driver of Fig. 7 is like the driver of Fig. 6, except that the outer electrode 71 is continuously tapered in width along its length.

The driver depicted in Fig. 8 comprising a crystal 72, inner electrode 73 and outer electrode 74 is essentially like the driver of Fig. 5 except that a single outer electrode 74 is used instead of the two electrodes 64 and 65 of Fig. 5. The electrode 74 has two portions a and b, the portion a being closer to the electrode 73 than portion b and the dimension in a direction perpendicular to the direction of light propagation being less for portion a than for portion b.

The driver of Fig. 9 comprising a crystal 75, inner electrode 76 and outer electrode 77 is like the driver of Fig. 8 except that the spacing between the inner electrode 76 and the outer electrode 77 changes less abruptly. The change in spacing may increase continuously from the top to the bottom of the electrode as viewed in the drawings, for example.

The driver element of Fig. 10, comprises a crystal 78, inner electrode 79, and outer electrode 80. The inner electrode 79 may be formed by plating the entire crystal with metal and then removing the metal from one of the faces by etching. The outer electrode which may be held in place by a spring clamp 81 is relatively wide in the direction of light propagation at its upper portion a and this portion is in contact with the crystal surface. The lower portion b of the electrode is narrower than the portion a and thinner, as shown, so that the portion b is spaced from the crystal surface.

The crystal having the metal plating at its edges is easily mounted by soldering to the metal tank, as shown in Fig. 10A. To allow for expansion, a thin flexible metal strip 120, such as copper foil, may be used for connecting the crystal to the tank, the edges of the plated electrode 79 being soldered to one edge of the metal strip and the opposite edge of the strip being soldered to the metal tank 20.

Fig. 11 shows a piezoelectric driver element for a supersonic light valve employing a crystal 82, the thickness of which varies along the direction of light propagation, positioned between an inner electrode 83 and an outer electrode 84. Such a tapered crystal may be used in any of the driver elements herein shown and described. If a quartz crystal is used, the thickness of the crystal may vary for example, from .2 millimeter at one edge to .35 millimeter at the opposite edge. Preferably the natural frequency of the crystal should vary directly with the distance from one edge of the crystal measured in the direction of light propagation through the supersonic cell, the natural frequency being determined from the equation frequency equals 2860 kilocycle millimeters divided by the thickness in millimeters.

In a modified light controlling arrangement in accordance with the present invention, as shown in Fig. 12, there are provided two supersonic cells 85 and 86 at different positions along the path of light propagation from the light source 87. The modulated high frequency signaling electromotive force is applied directly from leads 41 to the piezoelectric driver 87 of supersonic cell 86 and through a biased amplifier 110 to the piezoelectric driver 88 of supersonic cell 85. The slit separator 89 intercepts the diffracted portion of the light beam and transmits the undiffracted light which is modulated in accordance with the electromotive force impressed upon the driver 88. This modulated light beam is further modulated by the light valve comprising supersonic cell 86 and slit separator 90 to obtain a light beam which is modulated in accordance with a resultant desired light transmission-voltage characteristic curve.

The light modulating arrangement shown in Fig. 13 (plan view) and Fig. 14 (elevation) is like that shown in Fig. 12, but more compact. The supersonic light cell 91 comprises a driver 92 having two outer electrodes 93 and 94. Light from source 95 is directed through the upper portion of cell 91 having the outer electrode 93 and focussed upon a mirror having a reflecting surface 96 for reflecting only the undiffracted beam. The undiffracted beam from the upper portion of cell 91 is thus directed through the lower portion having the outer electrode 94. Similarly the light beam from the lower portion of cell 91 is directed upon a mirror 97 like the mirror 96, for reflecting the undiffracted portion of the incident beam.

Fig. 15 shows an arrangement of apparatus for improving the ratio of maximum to minimum light transmission through a supersonic light valve. As shown, the apparatus comprises a lamp having a cylindrical housing 100 and having a filament 101 extending in a direction perpendicular to the cylindrical axis. Light from the lamp is transmitted through the supersonic cell 102 in parallel rays and an image of the filament is focussed upon the bar of the bar light separator screen 103. Light from the filament reflected from the back wall of the lamp 101 is imaged upon an auxiliary light intercepting screen 104. The stray light transmitted through the apertures in screen 103 is thus reduced. It was found that by this method of tilting the lamp 100 and providing an auxiliary light stop 104 the ratio of maximum to minimum light transmission was increased from 25 to 50.

The curves of Fig. 16 show the relationship between the control voltage V applied to the line 41 in Fig. 12 and the driver voltages $V_1$ and $V_2$ applied to the piezoelectric drivers 87 and 88, respectively.

Curve B of Fig. 17 shows the relationship between the control voltage V and the light transmission for the supersonic light valve comprising the cell 85 and slit separator 89 while curve A similarly shows the relationship between the control voltage V and the light transmission for the light valve comprising cell 86 and slit separator 90. At any given value of control voltage, the light transmission through the two cells which are optically in series is the product of the transmission values for the two separate cells. The light transmission for curve B being unity over a range of values of control voltage, the resultant curve follows curve A over this portion of the voltage range. At higher values of control voltage, the resultant curve deviates from curve A as shown by the dash line $A \times B$. It is thus seen that the resultant characteristic $A \times B$ is preferable to the characteristic A or B since the substantially linear portion of the characteristic curve is extended at low values of light transmission, thus resulting in an increase in the ratio of maximum to minimum light transmission. The curves of Fig. 17 are also applicable to the embodiment of the invention shown in Figs. 13 and 14.

When there are employed a plurality of supersonic cells which modulate different portions respectively of a light beam, as described in connection with Figs. 1 to 11, inclusive, the total light transmission is obtained, for any given value of control voltage, by adding the values of light transmission for the individual cells. This may be explained by the curves of Fig. 18, the curve $a+b$ of which shows approximately the control voltage-light transmission characteristic of a supersonic light valve having a driver of the type shown in Fig. 8, for example. Curve $a$ shows the control voltage-light transmission characteristic for the cell having the outer electrode $74a$ while curve $b$ shows the characteristic for the cell having the outer electrode $74b$. The curves $a$ and $b$ are of different shape, respectively, that is, one curve is not a duplicate of the other except merely for a translation along one axis or along both axes. Depending upon the dimensions and spacings of the electrodes of the respective cells under consideration, one of the curves may be similar to another curve except for an expansion or a compression along one of the axes, or both or an expansion along one axis and a compression along another axis, for example. Since the dimension of the electrode $74a$ in the direction perpendicular to the direction of light transmission is relatively small, the portion of the light beam acted upon by this portion of the cell is likewise relatively small. Therefore, the maximum light transmission for this portion of the cell is relatively low as shown by curve $a$. However, electrode $74a$ is relatively closely spaced with respect to the common inner electrode 73. Therefore, the cell having electrode $74a$ is relatively more effective in modulating the portion of the light beam upon which it acts, that is, the amount of light transmitted in response to a certain control voltage is relatively large for values of light transmission below the maximum value. Therefore, at relatively low values of light transmission, the ratio of light transmission to control voltage is relatively high as shown by curve $a$. On the other hand, the cell having electrode $74b$ acts upon a relatively large portion of the light beam because the dimension of the electrode in the direction perpendicular to the direction of light transmission is relatively large but it is less effective in modulating this portion of the light beam because the electrode $74b$ is relatively widely spaced from the common electrode 79. The characteristic of cell 72, 73, 74b is, therefore, as shown by curve b of Fig. 18. The total light transmission-control voltage characteristic for a cell having a driver of the type shown in Fig. 8 is as shown by curve a+b of Fig. 18. This curve is obtained by adding the values of light transmission given by curves a and b at each value of control voltage. It is apparent that the ratio of maximum to minimum light transmission over the substantially linear portion of the characteristic is larger for curve a+b than it is for curve a or for curve b.

The curves of Fig. 18 are also applicable to the Fig. 4, for example, the curve a applying to the cell 52, 53, 54 and the curve b applying to the cell 52, 53, 55. In this case, both pairs of electrodes are equally spaced but the electrode 54 is wider in the direction of light transmission and shorter in the direction perpendicular to the direction of light transmission than electrode 55.

In Figs. 19 and 19A is shown a piezoelectric driver somewhat similar to that shown in Fig. 10 comprising an X-cut quartz crystal 130, an inner electrode 131 plated upon the crystal and an outer electrode 132 of aluminum, in part contiguous with the outer crystal surface and in part spaced therefrom, the driver being cemented with sealing wax to the tank 20 to close an opening provided therein. The outer electrode 131 is held in place by a suitable spring 133. The dimensions of the crystal, of the outer electrode and the spacing between one surface of the crystal and a portion of the outer electrode in millimeters are indicated on the drawings.

Figure 20:
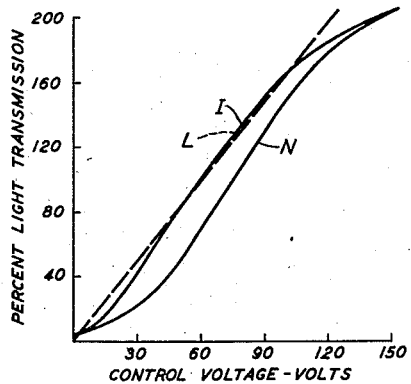

Curve I of Fig. 20 shows the relationship between per cent light transmission and control voltage obtained with a supersonic light valve employing a driver shown in Figs. 19 and 19A. For comparison are shown the straight dash line L and curve N for a supersonic light valve employing electrodes which are uniformly spaced and which are of uniform width in the direction of light transmission. It is apparent that the operating characteristic I represents an improvement over the characteristic N in that the ratio of maximum to minimum light transmission over a substantially linear region of the light transmission-control voltage characteristic is greater for curve I than it is for curve N.

In practice, a supersonic light valve having a desired light transmission-control voltage characteristic can be obtained empirically, for example, by repeatedly grinding the outer electrode 80 of Fig. 10 a small amount at a time to change the spacing of a certain portion of that electrode with respect to the inner electrode 79 or the dimension in the direction of light transmission or the dimension in a direction perpendicular to the direction of light transmission of a portion of the outer electrode 80 and measuring the light transmission-voltage characteristic after each grinding operation until the desired characteristic is obtained.

Alternatively the design of a supersonic light valve having a desired light transmission-control voltage characteristic may be based upon theoretical considerations. Consider a driver for a supersonic light valve having a piezoelectric crystal of uniform thickness $t_c$ and rectangular electrodes contiguous with the crystal faces of width $w$ in the direction of light transmission and of length $l$ in the direction perpendicular to the direction of light transmisson. If there is applied to the electrodes an alternating control voltage having an amplitude V and a frequency to which the crystal is resonant, since the electrodes are contiguous with the crystal faces the voltage drop $V_c$ across the crystal will be equal to that of the control voltage V. By varying the amplitude of the control voltage and measuring the light transmission of the supersonic cell, the relationship between percentage light transmission T and the voltage $V_c$ can be obtained. From these data there may be plotted a characteristic curve having values of T as ordinates and values of the product $V_c \times w$ as abscissae. This characteristic curve is unchanged by varying the width $w$, provided that $w$ is not too large. Therefore, as the value of $w$ is changed, the relationship between T and $V_c=V$ can be readily determined. Suppose now that an air-gap is provided by spacing one of the electrodes from the nearer face of the crystal by a uniform distance $t_a$ then $$V_c = \left(\frac{1}{1+\frac{t_a}{t_c}k_c}\right) V$$

where $k_c$ is the dielectric constant of the crystal, the dielectric constant of air being 1. Moreover, the light transmission T varies directly as the length of the electrodes $l$. From the relationships described, the light transmission-control voltage characteristic of any supersonic light valve may be found. Moreover, the driver for a supersonic light valve may be considered as being divided into a plurality of sections, each having electrodes of substantially uniform width and spacing. The light transmission-control voltage relationship may be determined for each section and the total light transmission-control voltage characteristic may be found by adding the values of light transmission for each value of control voltage, the sections being optically in parallel. When there are employed supersonic cells which are optically in series, the resulting light transmission may be found by multiplying the values of light transmission for the individual cells for each value of control voltage. Therefore, there may be chosen a driver or drivers for a supersonic light modulating apparatus having such component light transmission-control voltage characteristics that a desired total or resultant light transmission-control voltage characteristic is obtained.

In accordance with applicant's invention, therefore, there are provided a plurality of light valves, optically in series or in parallel and having different light transmission-control voltage characteristics, respectively, for modulating a light beam in accordance with a desired light transmission-control voltage characteristic.

What is claimed is:

1. An electro-optical light controlling apparatus comprising a first electrically controlled light controlling means for partially controlling a light beam in accordance with a certain light transmission-voltage characteristic, and a second electrically controlled light controlling means for partially controlling said light beam in accordance with a different light transmission-voltage characteristic, the rate of change of light transmission with respect to control voltage for the first light controlling means being greater than that for the second light controlling means at a certain voltage and the rate of change of light transmission with respect to control voltage for the second means being greater than that of the first at a different voltage.

2. An electro-optical light controlling apparatus comprising electrically controlled light controlling means for partially controlling a light beam in accordance with a certain light transmission-voltage characteristic and a second electrically controlled light controlling means for partially controlling the light beam in accordance with a different light transmission-voltage characteristic, the light transmission of the first light controlling means being greater than that of the second light controlling means at a certain voltage and the light transmission of the second means being greater than that of the first at a different voltage.

3. A light valve comprising a liquid, means comprising a piezoelectric crystal for setting up waves in said liquid due to the vibration of said crystal, said means having electrode means the dimension of which in a direction perpendicular to an axis of said electrode means is substantially different at different points on said axis.

4. A light valve in accordance with claim 2 in which the electrode means is partly in contact with said crystal and partly in spaced relation thereto.

5. Light controlling apparatus comprising a plurality of light valves which are optically in parallel for modulating a light beam, a source of signaling electromotive force, means for connecting one of said light valves to said source of electromotive force, an amplifier connected to said source of electromotive force, and means for connecting the output of said amplifier to the other of said light valves.

6. A driver for a supersonic light valve comprising a piezoelectric crystal and opposed electrodes between which may be set up an electric field for causing said crystal to vibrate, the spacing between said opposed electrodes being non-uniform and the dimension in a given direction of a portion of one of said electrodes which is relatively closely spaced with respect to the opposed electrode being different than the corresponding dimension of another portion which is relatively widely spaced with respect to the opposed electrode.

7. A driver for a supersonic light valve comprising a piezoelectric crystal and opposed electrodes between which may be set up an electric field for causing said crystal to vibrate, the dimension in the direction of light propagation through said light valve of the electrode on one side of the crystal being non-uniform.

8. A driver for a supersonic light valve comprising a piezoelectric crystal and opposed electrodes between which may be set up an electric field for causing said crystal to vibrate, both the spacing between said opposed electrodes and the dimension in the direction of light propagation through said light valve of the electrode on one side of the crystal being non-uniform.

9. A driver for a supersonic light valve comprising a piezoelectric crystal and opposed electrodes between which may be set up an electric field for causing said crystal to vibrate, the opposed electrodes being more closely spaced at one portion thereof than at another portion, the relatively closely spaced portion having a dimension in the direction perpendicular to the direction of light transmission through the light valve shorter than the relatively widely spaced portion.

10. A driver for a supersonic light valve comprising a piezoelectric crystal and opposed electrodes between which may be set up an electric field for causing said crystal to vibrate, one of said electrodes being contiguous with one face of the crystal, a portion of the second electrode being contiguous with the opposite face of the crystal while the remaining portion thereof is spaced from said crystal face, and spring means for holding the portion of the second electrode in contact with the crystal surface.

11. A driver for a supersonic light valve comprising a piezoelectric crystal and opposed electrodes between which may be set up an electric field for causing said crystal to vibrate, said opposed electrodes being differently spaced at different portions thereof, respectively, as measured along a plane perpendicular to the direction of light propagation through the light valve, a dimension of one of said opposed electrodes in a given direction being different at said differently spaced portions respectively.

12. A driver for a supersonic light valve comprising a piezoelectric crystal and opposed electrodes between which may be set up an electric field for causing said crystal to vibrate, said opposed electrodes being differently spaced at different portions thereof, respectively, as measured along a plane perpendicular to the direction of light propagation through the light valve, said opposed electrodes being substantially uniformly spaced as measured along any plane parallel to the direction of light propagation and intercepting the electrodes.

13. A driver for a supersonic light valve comprising a piezoelectric crystal of varying thickness along the direction of light transmission through the light valve, the natural frequency of portions of the crystal varying substantially directly with the distance from one edge of the crystal which is substantially perpendicular to the direction of light transmission, and opposed electrodes between which may be set up an electric field for causing said crystal to vibrate, said opposed electrodes being differently spaced at different portions thereof respectively as measured along a plane perpendicular to the direction of light propagation through the light valve.

14. A supersonic light valve for modulating a light beam under control of a signaling electromotive force comprising a piezoelectric crystal the vibration of different portions of which controls the modulation of different amounts of light of said light beam respectively, a source of signaling electromotive force, and means under control of electromotive force from said source for setting up electric fields of different intensities respectively and each varying in accordance with said electromotive force to cause said different portions respectively of said crystal to vibrate in accordance with the variations of said fields respectively.

15. A supersonic cell comprising a vessel containing a liquid through which compressional waves may be propagated, piezoelectric means at one end of said vessel for setting up compressional waves in said liquid, the opposite end of said vessel having a surface for reflecting the compressional waves at an angle of approximately 90 degrees with respect to the direction of propagation of said waves through said liquid, said vessel having a surface in the path of said reflected waves, and means for damping said compressional waves positioned near each of said surfaces, said means comprising a plurality of layers of fine mesh wire screen spaced with respect to each other.

16. A supersonic cell comprising a vessel having a liquid therein, means at one portion of said cell for setting up compressional waves in said liquid which are propagated therethrough to another portion of said cell, and means comprising a plurality of spaced screens having closely spaced small apertures therein in the path of said waves for attenuating said waves and thereby greatly reducing or eliminating reflection of waves from a surface of said vessel.

17. A light valve comprising a liquid, means comprising a piezoelectric crystal for setting up waves in said liquid due to the vibration of said crystal, said means including a pair of electrodes for said crystal one of which is partly in contact with said crystal and partly spaced from said crystal in a direction perpendicular to a surface of said crystal by an amount substantially greater than the minute spacings due to unavoidable irregularities in the surface of the crystal.

18. A light valve comprising a liquid, and means comprising a piezoelectric crystal for setting up waves in said liquid due to the vibration of said crystal, said crystal having a substantially plane surface, said means including a pair of electrodes for said crystal one of said electrodes being partly in contact with said substantially plane crystal surface and partly in spaced relation to the plane of said crystal surface, the spacing between said electrode and said crystal surface being measured along a perpendicular to said crystal surface.

GERALD W. WILLARD.